(12) United States Patent
Li

(10) Patent No.: US 9,465,426 B2
(45) Date of Patent: Oct. 11, 2016

(54) METHOD FOR BACKING UP DATA IN A CASE OF POWER FAILURE OF STORAGE SYSTEM, AND STORAGE SYSTEM CONTROLLER

(71) Applicant: Huawei Technologies Co., Ltd., Shenzhen, Guangdong (CN)

(72) Inventor: Yansong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 120 days.

(21) Appl. No.: 14/529,477

(22) Filed: Oct. 31, 2014

(65) Prior Publication Data

US 2015/0081958 A1  Mar. 19, 2015

Related U.S. Application Data

(63) Continuation of application No. PCT/CN2014/074430, filed on Mar. 31, 2014.

(30) Foreign Application Priority Data

Sep. 18, 2013  (CN) .......................... 2013 1 0428560

(51) Int. Cl.
| | |
|---|---|
| G06F 12/00 | (2006.01) |
| G06F 13/00 | (2006.01) |
| G06F 1/30 | (2006.01) |
| G06F 11/14 | (2006.01) |

(52) U.S. Cl.
CPC ............. *G06F 1/30* (2013.01); *G06F 11/1438* (2013.01); *G06F 11/1461* (2013.01)

(58) Field of Classification Search
None
See application file for complete search history.

(56) References Cited

U.S. PATENT DOCUMENTS

| | | | |
|---|---|---|---|
| 6,336,174 B1 | 1/2002 | Li et al. | |
| 7,958,432 B2 * | 6/2011 | Ash | G06F 11/2284 327/143 |
| 8,271,737 B2 | 9/2012 | Chen et al. | |
| 8,289,801 B2 | 10/2012 | Smith et al. | |
| 2004/0054851 A1 * | 3/2004 | Acton | G06F 11/1441 711/118 |
| 2004/0215912 A1 * | 10/2004 | Vergis | G11C 11/406 711/170 |
| 2006/0015683 A1 * | 1/2006 | Ashmore | G06F 1/3203 711/113 |
| 2009/0303630 A1 | 12/2009 | Zhou | |
| 2010/0121992 A1 | 5/2010 | Chen | |
| 2010/0202238 A1 * | 8/2010 | Moshayedi | G06F 11/1658 365/228 |
| 2011/0066884 A1 * | 3/2011 | Suzuki | G06F 11/1441 714/14 |
| 2011/0239021 A1 | 9/2011 | Vedder et al. | |

(Continued)

FOREIGN PATENT DOCUMENTS

| | | |
|---|---|---|
| CN | 1811725 A | 8/2006 |
| CN | 101251826 A | 8/2008 |

(Continued)

*Primary Examiner* — Sean D Rossiter

(57) ABSTRACT

The present invention discloses a method for backing up data in a case of a power failure of a storage system including: when a power failure is detected, acquiring current refresh progress of a buffer in a storage system, an address, in the buffer, of data that is in the buffer and needs to be backed up to a non-volatile memory in the storage system, and a first time required for backing up the data; calculating, according to the current refresh progress of the buffer and the address of the data in the buffer, a second time for which the data can at least keep being not lost since a last refresh; and stopping refreshing the buffer, and backing up the data to the non-volatile memory, if the second time is greater than the first time.

10 Claims, 6 Drawing Sheets

---

When a power failure is detected, acquire current refresh progress of a buffer in a storage system, an address, in the buffer, of data that is in the buffer and needs to be backed up to a non-volatile memory in the storage system, and first time required for backing up the data — S101

Calculate, according to the current refresh progress of the buffer and the address of the data in the buffer, second time for which the data can at least keep being not lost since a last refresh — S102

Stop refreshing the buffer and back up the data to the non-volatile memory, if the second time is greater than the first time — S103

(56) References Cited

U.S. PATENT DOCUMENTS

| | | | |
|---|---|---|---|
| 2012/0246398 A1* | 9/2012 | Hosaka | G06F 11/1441 711/103 |
| 2013/0159617 A1 | 6/2013 | Yu et al. | |
| 2015/0213851 A1* | 7/2015 | Mangione-Smith | G11C 14/0009 711/106 |
| 2016/0077974 A1* | 3/2016 | Kim | G06F 12/0893 711/135 |

FOREIGN PATENT DOCUMENTS

| | | |
|---|---|---|
| CN | 101286086 A | 10/2008 |
| CN | 101446926 A | 6/2009 |
| CN | 101504865 A | 8/2009 |
| CN | 101699413 A | 4/2010 |
| CN | 103500131 A | 1/2014 |
| EP | 0041520 A1 | 12/1981 |
| WO | WO 2013/054374 A1 | 4/2013 |

* cited by examiner

METHOD FOR BACKING UP DATA IN A CASE OF POWER FAILURE OF STORAGE SYSTEM, AND STORAGE SYSTEM CONTROLLER

CROSS-REFERENCE TO RELATED APPLICATIONS

This application is a continuation of International Application No. PCT/CN2014/074430, filed on Mar. 31, 2014, which claims priority to Chinese Patent Application No. 201310428560.2, filed on Sep. 18, 2013, both of which are hereby incorporated by reference in their entireties.

TECHNICAL FIELD

The present invention relates to the field of storage technologies, and in particular, to a method for backing up data in a case of a power failure of a storage system, and a storage system controller.

BACKGROUND

To solve a problem of data loss caused by a power failure of a storage system, in the prior art, a backup power supply is generally used to supply power in a case of a power failure, so that a storage system backs up data in a buffer. However, the backup power supply usually supplies power for a relatively short time, and a certain risk exists when data backup is performed by depending on the power supplied by the backup power supply in a case of a power failure.

In conclusion, how to extend power supply time of a backup power supply in a case of a power failure becomes an urgent problem to be solved in the industry.

SUMMARY

In view of this, the present invention provides a method for backing up data in a case of a power failure of a storage system, and a storage system controller, so as to extend power supply time of a backup power supply in a case of a power failure.

According to a first aspect, a method for backing up data in a case of a power failure of a storage system is provided and includes:

when a power failure is detected, acquiring current refresh progress of a buffer in a storage system, an address, in the buffer, of data that is in the buffer and needs to be backed up to a non-volatile memory in the storage system, and first time required for backing up the data;

calculating, according to the current refresh progress of the buffer and the address of the data in the buffer, second time for which the data can at least keep being not lost since a last refresh; and stopping refreshing the buffer, and backing up the data to the non-volatile memory, if the second time is greater than the first time.

In a first possible implementation manner, the acquiring current refresh progress of a buffer in a storage system specifically is:

acquiring, from a counter, the current refresh progress of the buffer in the storage system, where the current refresh progress is a current count value of the counter.

The count value of the counter increases according to a set value each time a refresh command is sent to the buffer.

With reference to the first aspect or the first possible implementation manner of the first aspect, in a second possible implementation manner, the calculating, according to the current refresh progress of the buffer and the address of the data in the buffer, second time for which the data can at least keep being not lost since a last refresh includes:

when a minimum row number p1 of the data in the buffer is greater than or equal to a row number p of the buffer corresponding to the current refresh progress, calculating the second time $t1=T1-[T2-(p1-p)*\Delta]$ for which the data can at least keep being not lost since the last refresh, where T1 is maximum time for which any row of data can keep after a refresh, T2 is a period for which a refresh is performed on the buffer, an interval at which two adjacent rows are refreshed $\Delta=T2/M$, and M is the total number of rows in the buffer.

With reference to the second possible implementation manner of the first aspect, in a third possible implementation manner, the calculating, according to the current refresh progress of the buffer and the address of the data in the buffer, second time for which the data can at least keep being not lost since a last refresh includes:

when a maximum row number p2 of the data in the buffer is smaller than or equal to the row number p of the buffer corresponding to the current refresh progress, calculating the second time $t1=T1-(p-p1)*\Delta$ for which the data can at least keep being not lost since the last refresh.

With reference to the second possible implementation manner of the first aspect or the third possible implementation manner of the first aspect, in a fourth possible implementation manner, the calculating, according to the current refresh progress of the buffer and the address of the data in the buffer, second time for which the data can at least keep being not lost since a last refresh includes:

when the row number p of the buffer corresponding to the current refresh progress is greater than the minimum row number p1 of the data in the buffer, and the row number p of the buffer corresponding to the current refresh progress is smaller than the maximum row number p2 of the data in the buffer, calculating the second time t1 for which the data can at least keep being not lost since the last refresh, where the second time t1 includes t2 and t3; t2 is time for which data ranging from the row number p to the row number p2 can at least keep since the last refresh, $t2=T1-T2$; t3 is time for which data ranging from the row number p1 to the row number p can at least keep since the last refresh, $t3=T1-(p-p1)*\Delta-t4$; and t4 is time required for backing up the data ranging from the row number p to the row number p2 to the non-volatile memory.

With reference to the fourth possible implementation manner of the first aspect, in a fifth possible implementation manner, the stopping refreshing the buffer if the second time is greater than the first time specifically is:

stopping refreshing the buffer if t2 is greater than t4 and t3 is greater than time t5 required for backing up the data ranging from the row number p1 to the row number p to the non-volatile memory.

According to a second aspect, a storage system controller is provided and includes:

an acquiring unit, configured to: when a power failure is detected, acquire current refresh progress of a buffer in a storage system, an address, in the buffer, of data that is in the buffer and needs to be backed up to a non-volatile memory in the storage system, and first time required for backing up the data;

a calculating unit, configured to calculate, according to the current refresh progress of the buffer and the address of the data in the buffer, second time for which the data can at least keep being not lost since a last refresh;

a refreshing unit, configured to stop refreshing the buffer if the second time is greater than the first time; and a backup unit, configured to back up the data to the non-volatile memory.

In a first possible implantation manner, the acquiring unit is specifically configured to acquire, from a counter, the current refresh progress of the buffer in the storage system, where the current refresh progress is a current count value of the counter.

The count value of the counter increases according to a set value each time a refresh command is sent to the buffer.

With reference to the second aspect or the first possible implementation manner of the second aspect, in a second possible implementation manner, the calculating unit is specifically configured to:

when a minimum row number p1 of the data in the buffer is greater than or equal to a row number p of the buffer corresponding to the current refresh progress, calculate the second time $t1=T1-[T2-(p1-p)*\Delta]$ for which the data can at least keep being not lost since the last refresh, where T1 is maximum time for which any row of data can keep after a refresh, T2 is a period for which a refresh is performed on the buffer, an interval at which two adjacent rows are refreshed $\Delta=T2/M$, and M is the total number of rows in the buffer.

With reference to the second possible implementation manner of the second aspect, in a third possible implementation manner, the calculating unit is further specifically configured to:

when a maximum row number p2 of the data in the buffer is smaller than or equal to the row number p of the buffer corresponding to the current refresh progress, calculate the second time $t1=T1-(p-p1)*\Delta$ for which the data can at least keep being not lost since the last refresh.

With reference to the second possible implementation manner of the second aspect or the third possible implementation manner of the second aspect, in a fourth possible implementation manner, the calculating unit is further specifically configured to:

when the row number p of the buffer corresponding to the current refresh progress is greater than the minimum row number p1 of the data in the buffer, and the row number p of the buffer corresponding to the current refresh progress is smaller than the maximum row number p2 of the data in the buffer, calculate the second time t1 for which the data can at least keep being not lost since the last refresh, where the second time t1 includes t2 and t3; t2 is time for which data ranging from the row number p to the row number p2 can at least keep since the last refresh, $t2=T1-T2$; t3 is time for which data ranging from the row number p1 to the row number p can keep since the last refresh, $t3=T1-(p-p1)*\Delta-t4$; and t4 is time required for backing up the data ranging from the row number p to the row number p2 to the non-volatile memory.

With reference to the fourth possible implementation manner of the second aspect, in a fifth possible implementation manner, the refreshing unit is specifically configured to:

stop refreshing the buffer if t2 is greater than t4 and t3 is greater than time t5 required for backing up the data ranging from the row number p1 to the row number p to the non-volatile memory.

According to the present invention, when a power failure occurs to a storage system and data in a buffer needs to be backed up to a non-volatile memory, a refresh operation is stopped in a case in which data backup can be completed before a refresh is performed again on to-be-backed-up data, so that power consumption resulting from an unnecessary refresh operation can be saved and power supply time of a backup power supply can be extended.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
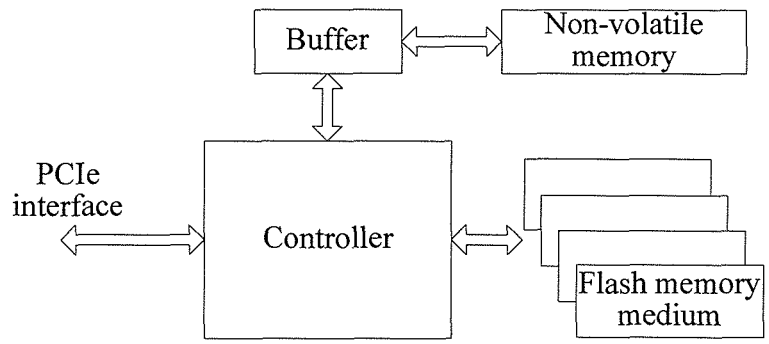
FIG. 1 is a schematic structural diagram of a storage system in a form of a PCIe plug-in card.
Figure 2:
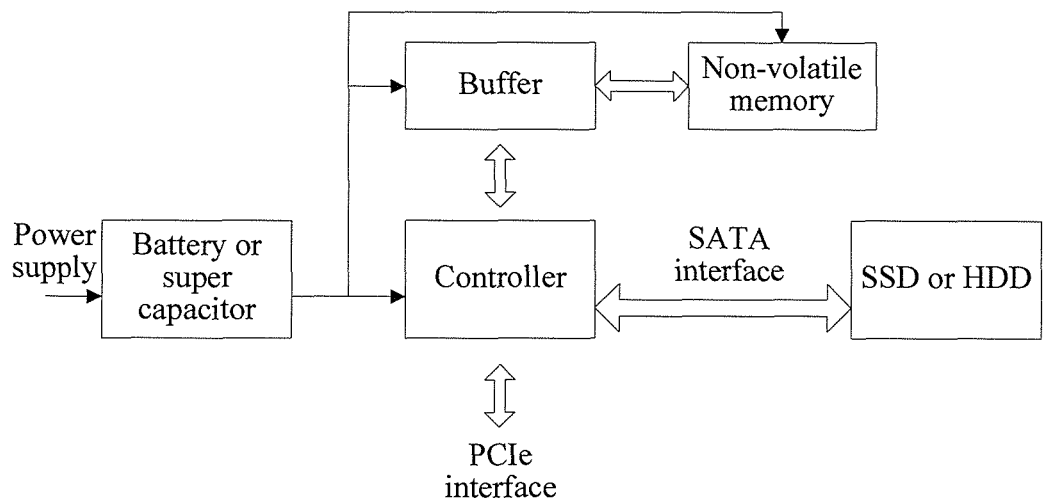
FIG. 2 is a schematic structural diagram of a storage system in a separate form.

A storage system in the present invention may be a solid state drive (Solid State Drive, SSD) in a form of a Peripheral Component Interconnect Express (Peripheral Component Interconnect, PCIe) plug-in card shown in FIG. 1, or may be an SSD or a hard disk drive (Hard Disk Drive, HDD) in a separate form shown in FIG. 2. For the SSD in the form of the PCIe plug-in card shown in FIG. 1, a controller and a flash memory medium are integrated. The storage system, that is, the SSD, has only one controller, the flash memory medium is a non-volatile memory, and a peripheral non-volatile memory is further connected to a buffer. For the SSD or HDD in the separate form shown in FIG. 2, one storage system may have multiple SSDs or HDDs connected to one controller, and the SSDs or HDDs themselves also have one controller connected to their memory mediums, where their memory mediums are non-volatile memories; a peripheral non-volatile memory is further connected to a buffer; and the storage system may be a redundant array of independent disks (Redundant Array of Independent Disks, RAID).

By using the SSD in the form of the PCIe plug-in card shown in FIG. 1 as an example, the SSD is a storage device that uses a flash memory as a storage medium. Because the storage device does not have a rotating component such as a hard disk drive, the storage device has higher read and write performance, better environmental adaptability, lower power consumption, and is referred to as a solid state drive. PCIe is usually used as a data interface of the SSD, and the SSD is formed by three parts: a controller, a buffer, and a flash memory medium. The flash memory medium is used to store data for a long time, and the data is not lost after a power failure.

Figure 3:
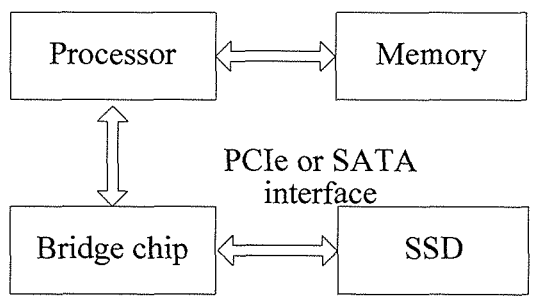
FIG. 3 is a schematic structural diagram of a system in which a solid state drive SSD is located.

The controller is configured to receive, from a PCIe interface, a read/write command that is sent by a host, and after parsing the command, write data into the flash memory medium (a write operation), or read data from the flash memory medium and return the data to a host (a read operation). The host usually refers to a small system based on a processor of a system in which the SSD is located, and the host includes a processor, a memory, and a bridge chip, and is responsible for running an operating system and executing an application program, and initiating read/write access to the SSD. The system in which the SSD is located may be a server or a personal computer. A block diagram of the system is shown in FIG. 3.

A buffer is usually disposed in a storage system, where the buffer is connected to a controller of the storage system. The buffer is usually formed by a dynamic random access memory (Dynamic Random Access Memory, DRAM), and is used to temporarily save data to be written into a flash memory medium or data read from a flash memory medium, and a working parameter such as an address mapping table. Because a speed of a DRAM is higher than that of a flash memory medium, a read/write speed of an SSD can be increased by using a buffer; meanwhile, because the number of erase and write times is limited for a flash memory medium, erase and write frequency can be decreased by using a buffer, thereby extending a service life of an SSD.

However, a risk of a power failure may exist in a working process of an SSD, for example, a power failure occurs to a server or a personal computer in which the SSD is located due to a fault of a power supply, and the SSD also powers off at the same time; whereas, after the power failure, information in a DRAM that is used in a buffer is lost, which includes some data that has not been written into a flash memory medium, and loss of the data causes a data error in the flash memory medium. A backup power supply such as a backup battery or a super capacitor is used in the present invention to supply power in a case of a power failure.

When a backup battery is used to supply power in a case of a power failure, a backup battery may be switched to for supplying power to a storage system after the power failure occurs. Batteries with different capacities may last for different periods of time, which may usually reach several days, and are sufficient for backing up data in a buffer. However, the backup battery has a relatively large size and occupies relatively more space in the storage system, which affects the number of available non-volatile memories in the storage system; furthermore, a storage capacity of the storage system is affected, and the backup battery has problems of environment pollution and short service life.

Another method is that: a backup battery is replaced with a super capacitor, and the super capacitor is charged before a power failure and is discharged after the power failure, so as to supply power for writing data in a buffer into a non-volatile memory. The super capacitor is a new type of capacitor whose capacity reaches a farad level, and has advantages such as a small size, fast charging, a large number of cycles, a good temperature feature, and no pollution. Power supply time for which the super capacitor can last may vary from dozens of milliseconds to several seconds according to different power consumption of the storage system. However, the power supply time is relatively short and the capacity of the super capacitor gradually decreases due to aging, and power consumption of the storage system also increases as an environmental temperature increases.

Firstly, a refresh principle of a DRAM is introduced:

A DRAM, as a buffer, is a volatile memory, which stores data by using a parasitic capacitor of a storage unit. Because an electricity leakage phenomenon exists in the parasitic capacitor, a periodic refresh is required during normal working to ensure that data in the DRAM is not lost. Specifically, a controller periodically sends a refresh command to the DRAM, and there is a refresh counter inside the DRAM. Each time a valid refresh command is received, the counter increases by 1, and this count value corresponds to a row of storage units inside the DRAM, and then the row is refreshed. For example, there are 8192 rows of storage units inside the DRAM, the refresh counter has 13 digits, and an initial value of the counter is 0. Each refresh command sent by the controller increases the counter by 1, and the value, after being totaled to 0x1FFF, returns to 0 for recounting.

A refresh command of the DRAM is defined by a specific combination of several signals; when a chip select signal/CS is 0, a row address strobe/RAS is 0, a column address strobe/CAS is 0, and a write enable signal/WE is 1, it is considered that a valid refresh command is received, where the chip select signal, the row address strobe, the column address strobe, and the write enable signal are obtained by sampling by a synchronization clock signal CLK at a certain moment.

The DRAM periodically performs a refresh in a unit of row according to a sequence; and refreshes one row each time, and further refreshes a next row after a refresh interval until all rows are refreshed for one time. According to a DRAM specification, a refresh period for a same row does not exceed 64 milliseconds (when a case temperature of the DRAM is below 85° C., a refresh needs to be performed faster when the temperature is higher than 85° C.), or in other words, a period for which all 8192 rows are refreshed for one time does not exceed 64 milliseconds at most; otherwise, a risk of data loss exists. Accordingly, a refresh interval between two adjacent rows may be calculated, which is 64000/8192=7.8125 microseconds, and this parameter is recorded as tREFI in the specification. To ensure a certain surplus capacity, an actual refresh period is usually shorter than 64 milliseconds.

In a process in which the DRAM performs a refresh operation and within a period of time after the refresh is completed, any other operation cannot be performed. This period of time is recorded as tRFC in the specification, and is usually greater than a hundred nanoseconds. A larger capacity of the DRAM indicates a larger value of the parameter; therefore, the refresh operation affects read/write performance of the DRAM.

When the DRAM performs a refresh, a current is relatively large and is usually greater than dozens of milliamperes; therefore, electricity consumption increases.

Then, how to ensure reliability of backing up data in a case of a power failure of a storage system is discussed.

When a power failure occurs to a storage system, data in a buffer needs to be backed up to a non-volatile memory as quickly as possible; otherwise, because of a voltage dip caused by insufficient electricity of a super capacitor, storing data cannot be continued, which causes data loss. It can be learned, according to the foregoing description, that the DRAM consumes relatively more currents during a refresh, and any operation cannot be performed during a refresh and data backup must be suspended, and all these increase a risk of data loss.

Considering that, in a practical application, backing up all data in an entire buffer is not required. In one aspect, it is because the buffer has a relatively large capacity, for example, 1 GB, and it takes a long time to back up all data and an amount of electricity of a super capacitor cannot meet this requirement; and in another aspect, it is because there is a relatively small amount of content that actually needs to be backed up, for example, 20 MB, and this is user data that has not been written into a flash memory medium temporarily, whereas other data in the buffer is parameters that are required for running a controller, for example, an address mapping table, which can be regenerated each time an SSD restarts, and does not need to be backed up. In this case, if to-be-backed-up data can still keep for sufficient time after a last refresh, the data is not lost even in a process in which the data is all backed up to the flash memory medium. Therefore, a refresh operation may be stopped to avoid increasing of unnecessary power consumption.

Specifically, it is assumed that a total capacity of a buffer is 128 MB, and the buffer is formed by four DRAM chips; each chip has a data line of 8 bits, a row address of 13 bits corresponding to 8 K rows, a column address of 10 bits corresponding to 1 K columns, and a bank address of 2 bits corresponding to 4 banks. In this way, a capacity of each DRAM chip is 8K*1K*4=32 MB. Each time a controller sends a refresh command, the four DRAM chips receive the command at the same time and perform a refresh, 4 banks inside each DRAM chip also perform a refresh at the same time, and a same refresh counter provides a current refresh row address; therefore, a refresh condition of only one DRAM chip may be investigated.

Therefore, the present invention provides a method for backing up data in a case of a power failure of a storage system, and a storage system controller. When a power failure occurs to a storage system and data in a buffer needs to be backed up to a non-volatile memory, a refresh operation is stopped in a case in which data backup can be completed before a refresh is performed on to-be-backed-up data, so that power consumption resulting from an unnecessary refresh operation can be saved and power supply time of a backup power supply can be extended.

Figure 4:
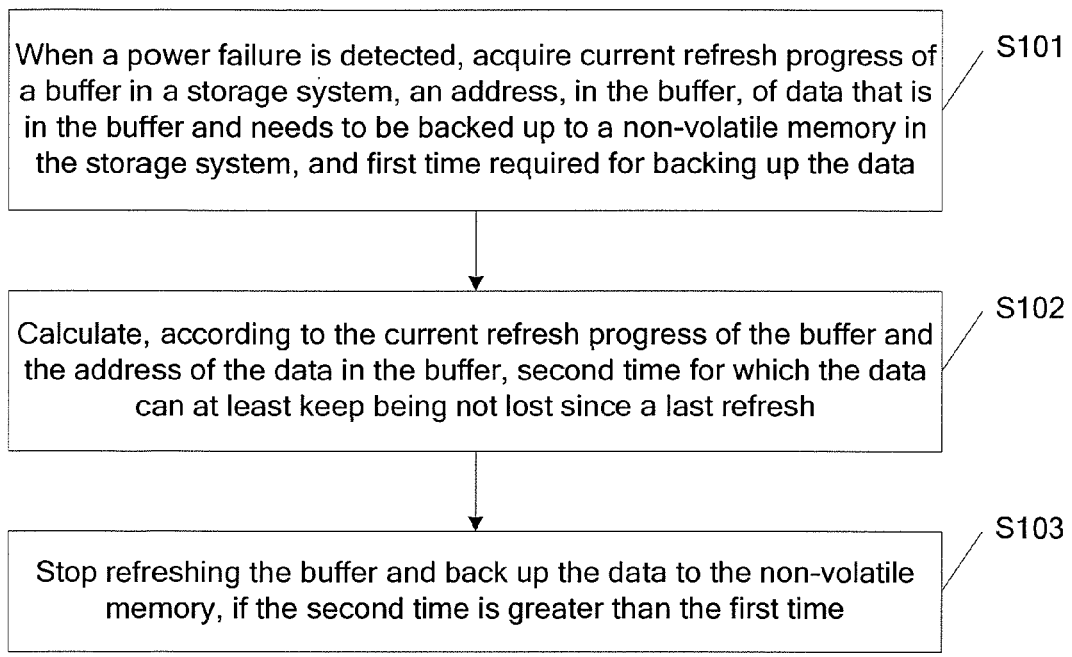
FIG. 4 is a flowchart of an embodiment of a method for backing up data in a case of a power failure of a storage system according to the present invention.

FIG. 4 is a flowchart of an embodiment of a method for backing up data in a case of a power failure of a storage system according to the present invention. As shown in FIG. 4, the method includes:

Step S101: When a power failure is detected, acquire current refresh progress of a buffer in a storage system, an address, in the buffer, of data that is in the buffer and needs to be backed up to a non-volatile memory in the storage system, and first time required for backing up the data.

A controller of the storage system may be connected to a voltage detection circuit; when the circuit detects that a power supply voltage provided by the system dips below a rated value, it is considered that a power failure occurs, and then an indication signal is generated and sent to a controller of an SSD; and when the controller detects the power failure, a data backup operation after the power failure can be started.

The controller controls a refresh for the buffer. When the controller detects a power failure, current refresh progress of refreshing the buffer performed by the controller can be acquired, and the controller sequentially performs a refresh on data in the buffer according to an address, where the current refresh progress is an address that is currently refreshed in the buffer.

The controller controls a read/write operation on the buffer, and therefore, the address, in the buffer, of the data that is in the buffer and needs to be backed up to the non-volatile memory in the storage system can be acquired and time 1 required for backing up the data to the non-volatile memory can be easily calculated.

It should be noted that, if the storage system is an SSD in a form of a PCIe plug-in card shown in FIG. 1, the non-volatile memory in the present invention may be a flash memory medium in the SSD or may be a non-volatile memory that is connected to a buffer in the SSD, and backup of data in the buffer is controlled by a controller of the SSD; and if the storage system is an SSD or an HDD in a separate form shown in FIG. 2, and the controller of the storage system is connected to multiple SSDs or HDDs, the non-volatile memory in the present invention may be a storage medium in an SSD or an HDD or may be a non-volatile memory that is connected to a buffer in the storage system, and backup of data in the buffer is controlled by the controller of the storage system.

It is possible that the address that is currently refreshed in the buffer is smaller than, or equal to, or greater than an initial address of to-be-backed-up data in the buffer, that is, the controller has not refreshed the data or has just refreshed the data in this refresh; and it is also possible that the address that is currently refreshed in the buffer partly overlaps an address of the data in the buffer, that is, the controller is refreshing the data.

Step S102: Calculate, according to the current refresh progress of the buffer and the address of the data in the buffer, second time for which the data can at least keep being not lost since a last refresh.

The data in the buffer can keep being not lost for some time after a refresh operation. Time 2 for which the data can keep being not lost since a last refresh can be calculated according to a current address of this refresh in the buffer and the address, in the buffer, of the to-be-backed-up data.

Step S103: Stop refreshing the buffer and back up the data to the non-volatile memory, if the second time is greater than the first time.

If the time 2 for which the data can further keep being not lost since the last refresh is greater than the time 1 required for backing up the data to the non-volatile memory in the storage system, that is, the data can also keep being not lost although no refresh is performed within the time 1, a refresh on the buffer may be stopped to back up the data to the storage medium. Because the refresh on the buffer is stopped, power consumption resulting from an unnecessary refresh operation can be saved and power supply time of a backup power supply can be extended. If the time 2 is not greater than the time 1, a refresh and data backup are still performed.

According to the method for backing up data in a case of a power failure of a storage system provided in this embodiment of the present invention, when a power failure occurs to a storage system and data in a buffer needs to be backed up to a non-volatile memory, a refresh operation is stopped in a case in which data backup can be completed before a refresh is performed on to-be-backed-up data, so that power consumption resulting from an unnecessary refresh operation can be saved and power supply time of a backup power supply can be extended.

Figure 5:
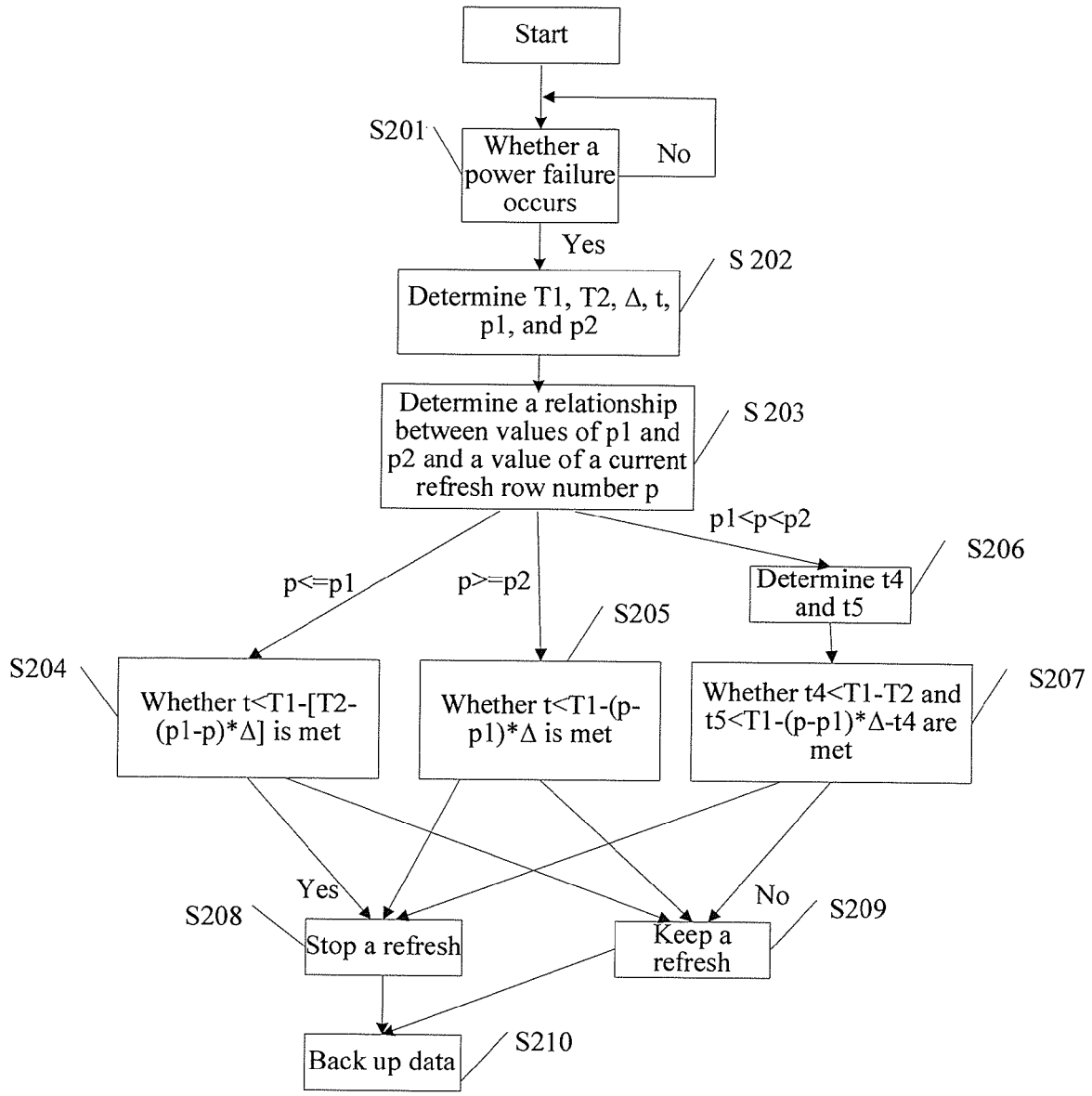
FIG. 5 is a flowchart of another embodiment of a method for backing up data in a case of a power failure of a storage system according to the present invention.

FIG. 5 is a flowchart of another embodiment of a method for backing up data in a case of a power failure of a storage system according to the present invention. As shown in FIG. 5, the method includes:

Step S201: Detect whether a power failure occurs. If yes, perform step S202; otherwise, perform S201 to continue the detection.

A controller continually detects whether a power failure indication signal sent by a voltage detection circuit in a storage system is received. When the voltage detection circuit detects that a power supply voltage provided by the system dips below a rated value, it is considered that a power failure occurs, and then an indication signal is generated and sent to a controller of an SSD; therefore, the controller can start a data backup operation after the power failure.

Step S202: Determine T1, T2, $\Delta$, t, p1, and p2.

In the present invention, the buffer is generally a DRAM, data in the DRAM is stored according a row and a column, and refreshed according a row, and the controller acquires a row number of stored data. Herein, T1 is maximum time for which any row of data can keep after a refresh, T2 is a period for which a refresh is performed on the buffer, and T2<T1. An interval at which two adjacent rows are refreshed $\Delta=T2/M$, and M is the total number of rows in the buffer. t is time required for backing up the data in the buffer to a storage medium. p1 and p2 are a minimum row number and a maximum row number, in the buffer, of to-be-backed-up data respectively.

It should be noted that, the data in the buffer is backed up according to a sequence from a low address to a high address, that is, the sequence is consistent with a refresh sequence.

Figure 6A:
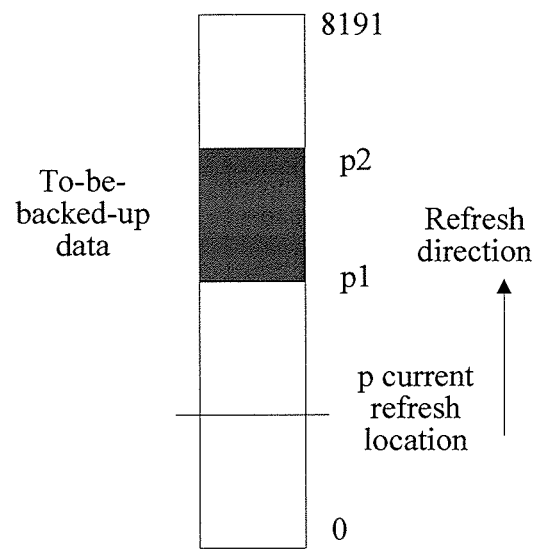
FIG. 6a is a schematic diagram of a case of a relationship between current refresh progress of a buffer and a location of to-be-backed-up data.
Figure 6B:
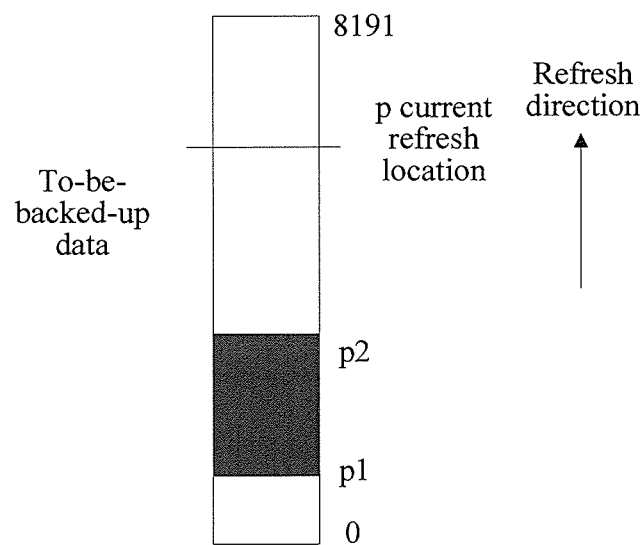
FIG. 6b is a schematic diagram of another case of a relationship between current refresh progress of a buffer and a location of to-be-backed-up data.
Figure 6C:
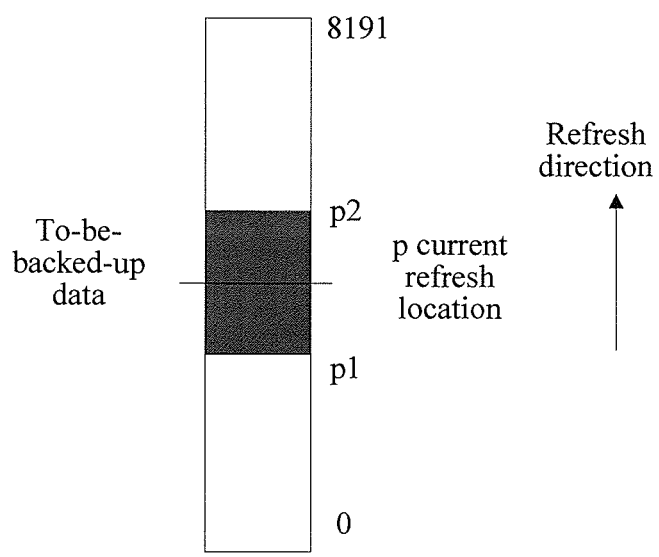
FIG. 6c is a schematic diagram of still another case of a relationship between current refresh progress of a buffer and a location of to-be-backed-up data.

Three cases may be categorized according to a relationship between current refresh progress and a location of the to-be-backed-up data. As shown in FIG. 6a, a first case is that the location of the to-be-backed-up data is above a current refresh location; as shown in FIG. 6b, a second case is that the location of the to-be-backed-up data is below the current refresh location; and as shown in FIG. 6c, a third case is that the current refresh location is in the middle of the to-be-backed-up data. The following separately describes each of the cases:

Step S203: Determine a relationship between values of p1 and p2 and a value of a current refresh row number p. If p≤p1, perform S204; if perform step S205; and if p1<p<p2, perform step S206.

For the current refresh location, that is, the current refresh row number p, if p≤p1, it is the first case; if p≥p2, it is the second case; and if p1<p<p2, it is the third case.

In this embodiment of the present invention, a counter may be integrated inside a controller, or an independent counter may be connected to a controller, where the counter is similar to a refresh counter inside a DRAM. After power on and reset, an initial value is 0, and each time the controller sends a refresh command, a value of the counter increases. The counter is used to record current refresh progress, and keeps synchronized with the refresh counter in the DRAM.

Step S204: Determine whether t<T1−[T2−(p1−p)*$\Delta$] is met. If yes, perform step S208; otherwise, perform S209.

As shown in FIG. 6a, p≤p1, and the location of the to-be-backed-up data is above the current refresh location. Because data in rows above the row p1 is refreshed after p1 in a last refresh, the data may keep for a relatively long time, and therefore is not lost definitely. Therefore, only a relationship between time for which the data in the minimum row number p1 can further keep and time required for backing up data ranging from the row p1 to the row p2 to the storage medium needs to be considered. For the row p1, time that is further required to complete a refresh period since the last refresh is completed is (p1−p)*$\Delta$, and therefore time that has elapsed since the last refresh is T2−(p1−p)*$\Delta$; whereas maximum time for which data in the row p1 keeps being not lost is T1, and is usually 64 ms, and therefore T1−[T2−(p1−p)*$\Delta$] indicates that time for which the data in the row p1 can further keep being not lost.

If t<T1−[T2−(p1−p)*$\Delta$], a refresh may be stopped and all the data ranging from the row p1 to the row p2 is backed up to a non-volatile memory; otherwise, the refresh is continued.

Step S205: Determine whether t<T1−(p−p1)*$\Delta$ is met. If yes, perform step S208; otherwise, perform S209.

As shown in FIG. 6b, p≥p2, the location of the to-be-backed-up data is below the current refresh location, and a current location p is above p1, which is equivalent to that, the row p1 has just been refreshed (because a refresh direction is from bottom to top); therefore, it can be directly obtained that time that has elapsed since the refresh is (p−p1)*$\Delta$. Therefore, T1−(p−p1)*$\Delta$ is time for which data in the row p1 can further keep being not lost.

If t<T1−(p−p1)*$\Delta$, a refresh may be stopped and all the data ranging from the row p1 to the row p2 is backed up to the non-volatile memory; otherwise, the refresh is continued.

Step S206: Determine t4 and t5.

Step S207: Determine whether t4<T1−T2 and t5<T1−(p−p1)*$\Delta$−t4 are met. If yes, perform step S208; otherwise, perform S209.

As shown in FIG. 6c, p1<p<p2, when the current refresh location is in the middle of the to-be-backed-up data, and time required for backing up data ranging from the row p to the row p2 to the non-volatile memory is t4, t4=t*(p2−p)/(p2−p1), where t is total time required for backing up data ranging from the row p1 to the row p2 to the non-volatile memory. For the data ranging from the row p to the row p2, the controller currently performs a refresh exactly on the row p, and therefore time for which the data ranging from the row number p to the row number p2 can at least keep being not lost is t2=T1−T2, and t4 should meet t4<T1−T2.

Time required for backing up data ranging from the row p1 to the row p to the non-volatile memory is t5, and t5=t*(p−p1)/(p2−p1). For the data ranging from the row p1 to the row p, a case is similar to the second case; therefore time for which the data ranging from the row number p1 to the row number p can at least keep since the last refresh is t3=T1−(p−p1)*$\Delta$−t4, and t5 should meet t5<T1−(p−p1)*$\Delta$−t4.

When t4<T1−T2 and t5<T1−(p−p1)*$\Delta$−t4, a refresh may be stopped, and the data ranging from the row p1 to the row p2 is backed up to the non-volatile memory; otherwise, step S209 and S210 are performed, and the refresh and data backup are performed.

Step S208: Stop the refresh.
Step S209: Keep the refresh.
Step S210: Back up data.

For the first and second cases, the data ranging from the row p1 to the row p2 is sequentially backed up to the non-volatile memory; and for the third case, the data ranging from the row p to the row p2 is first backed up to the non-volatile memory, and then the data ranging from the row p1 to the row p is backed up to the non-volatile memory. For the foregoing three cases, if the time for which the data can at least keep being not lost since the last refresh is not greater than time required for backing up the data, keeping the refresh and backing up the data are required. According to the method for backing up data in a case of a power failure of a storage system provided in this embodiment of the present invention, when a power failure occurs to a storage system and data in a buffer needs to be backed up to a non-volatile memory, a refresh operation is stopped in a case in which data backup can be completed before a refresh is performed on to-be-backed-up data, so that power consumption resulting from an unnecessary refresh operation can be saved, power supply time of a backup power supply can be extended, and time for data backup can be shortened.

Figure 7:
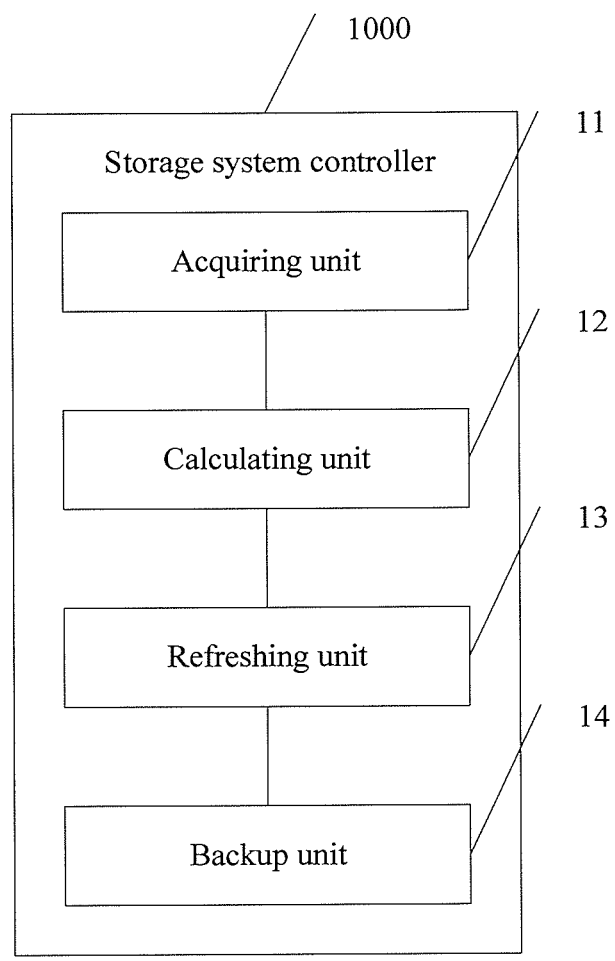
FIG. 7 is a schematic structural diagram of an embodiment of a storage system controller according to the present invention.

FIG. 7 is a schematic structural diagram of an embodiment of a storage system controller according to the present invention. As shown in FIG. 7, the storage system controller 1000 includes:

an acquiring unit 11, configured to: when a power failure is detected, acquire current refresh progress of a buffer in a storage system, an address, in the buffer, of data that is in the buffer and needs to be backed up to a non-volatile memory in the storage system, and first time required for backing up the data;

a calculating unit 12, configured to calculate, according to the current refresh progress of the buffer and the address of the data in the buffer, second time for which the data can at least keep being not lost since a last refresh;

a refreshing unit 13, configured to stop refreshing the buffer if the second time is greater than the first time; and a backup unit 14, configured to back up the data to the non-volatile memory.

According to the storage system controller provided in this embodiment of the present invention, when a power failure occurs to a storage system and data in a buffer needs to be backed up to a non-volatile memory, a refresh operation is stopped in a case in which data backup can be completed before a refresh is performed on to-be-backed-up data, so that power consumption resulting from an unnecessary refresh operation can be saved and power supply time of a backup power supply can be extended.

In some embodiments, the acquiring unit is specifically configured to acquire, from a counter, the current refresh progress of the buffer in the storage system, where the current refresh progress is a current count value of the counter, and the count value of the counter increases according to a set value each time a refresh command is sent to the buffer.

In this embodiment of the present invention, a counter may be integrated inside a controller, or an independent counter may be connected to a controller, where the counter is similar to a refresh counter inside a DRAM. After power on and reset, an initial value is 0, and each time the controller sends a refresh command, a value of the counter increases. The counter is used to record current refresh progress, and keeps synchronized with the refresh counter in the DRAM.

The calculating unit is specifically configured to:

when a minimum row number p1 of the data in the buffer is greater than or equal to a row number p of the buffer corresponding to the current refresh progress, calculate the second time $t1=T1-[T2-(p1-p)*\Delta]$ for which the data can at least keep being not lost since the last refresh, where T1 is maximum time for which any row of data can keep after a refresh, T2 is a period for which a refresh is performed on the buffer, an interval at which two adjacent rows are refreshed $\Delta=T2/M$, and M is the total number of rows in the buffer.

The calculating unit is further specifically configured to:

when a maximum row number p2 of the data in the buffer is smaller than or equal to the row number p of the buffer corresponding to the current refresh progress, calculate the second time $t1=T1-(p-p1)*\Delta$ for which the data can at least keep being not lost since the last refresh.

The calculating unit is further specifically configured to:

when the row number p of the buffer corresponding to the current refresh progress is greater than the minimum row number p1 of the data in the buffer, and the row number p of the buffer corresponding to the current refresh progress is smaller than the maximum row number p2 of the data in the buffer, calculate the second time t1 for which the data can at least keep being not lost since the last refresh, where the second time t1 includes t2 and t3; and t2 is time for which data ranging from the row number p to the row number p2 can at least keep since the last refresh, $t2=T1-T2$; t3 is time for which data ranging from the row number p1 to the row number p can at least keep since the last refresh, $t3=T1-(p-p1)*\Delta-t4$; and t4 is time required for backing up the data ranging from the row number p to the row number p2 to the non-volatile memory.

The refreshing unit is specifically configured to:

stop refreshing the buffer if t2 is greater than t4 and t3 is greater than time t5 required for backing up the data ranging from the row number p1 to the row number p to the non-volatile memory.

For a case in which the minimum row number p1 of the data in the buffer is greater than or equal to the row number p of the buffer corresponding to the current refresh progress and a case in which the maximum row number p2 of the data in the buffer is smaller than or equal to the row number p of the buffer corresponding to the current refresh progress, data ranging from the row p1 to the row p2 is sequentially backed up to the non-volatile memory; and for a case in which the row number p of the buffer corresponding to the current refresh progress is greater than the minimum row number p1 of the data in the buffer and a case in which the row number p of the buffer corresponding to the current refresh progress is smaller than the maximum row number p2 of the data in the buffer, the data ranging from the row p to the row p2 is first backed up to the non-volatile memory, and then the data ranging from the row p1 to the row p is backed up to the non-volatile memory. For the foregoing three cases, if the time for which the data can at least keep being not lost since the last refresh is not greater than time required for backing up the data, keeping the refresh and backing up the data are required.

According to the storage system controller provided in this embodiment of the present invention, when a power failure occurs to a storage system and data in a buffer needs to be backed up to a non-volatile memory, a refresh operation is stopped in a case in which data backup can be completed before a refresh is performed on to-be-backed-up data, so that power consumption resulting from an unnecessary refresh operation can be saved, power supply time of a backup power supply can be extended, and time for data backup can be shortened.

It may be clearly understood by a person skilled in the art that, for ease and brevity of description, for a specific working process of the foregoing device and module, reference may be made to a corresponding process in the foregoing method embodiments, and details are not described herein again.

In several embodiments provided in the present application, it should be understood that the disclosed device and method may be implemented in other manners. For example, the described apparatus embodiment is merely exemplary. For example, the module division is merely logical function division and may be other division in actual implementation. For example, multiple modules or components may be combined or integrated into another device, or some features may be ignored or not performed. In addition, the displayed or discussed mutual couplings or direct couplings or communication connections may be implemented through some communications interfaces. The indirect couplings or communication connections between the apparatuses or modules may be implemented in electronic, mechanical, or other forms.

The modules described as separate parts may or may not be physically separate, and parts displayed as modules may or may not be physical units, may be located in one position, or may be distributed on multiple network units. A part or all of the modules may be selected according to actual needs to achieve the purposes of the solutions of the embodiments.

In addition, functional modules in the embodiments of the present invention may be integrated into one processing module, or each of the modules may exist alone physically, or two or more modules are integrated into one module.

Based on descriptions of the foregoing embodiments, a person skilled in the art may clearly understand that, each implementation manner may be implemented by software and a necessary general hardware platform, or may be implemented by hardware. Based on such an understanding, the technical solutions essentially or the parts contributing to the prior art may be implemented in the form of a software device. The computer software device is stored in a storage medium, such as a ROM/RAM, a magnetic disk, or an optical disc, and includes several instructions for instructing a computer device (which may be a personal computer, a server, a network device, or the like) to execute the methods described in the embodiments or in some parts of the embodiments.

Implementation manners described in the foregoing are not limitations on the protection scope of the technical solutions. Any modifications, equivalent substitutions, and improvements made within the spirit and principle of the foregoing implementation manners shall all fall within the protection scope of the technical solutions.

What is claimed is:

1. A method for backing up data in a case of a power failure of a storage system, the method comprising:
   when a power failure is detected, acquiring current refresh progress of a buffer in a storage system, an address of data that is in the buffer which needs to be backed up to a non-volatile memory in the storage system, and a first time required for backing up the data;
   calculating, according to the current refresh progress of the buffer and the address of the data in the buffer, a second time for which the data can at least keep being not lost since a last refresh; and
   stopping refreshing the buffer, and backing up the data to the non-volatile memory, when the second time is greater than the first time;
   wherein acquiring current refresh progress of a buffer in a storage system comprises:
      acquiring, from a counter, the current refresh progress of the buffer in the storage system, wherein the current refresh progress is a current count value of the counter and the count value of the counter increases according to a set value each time a refresh command is sent to the buffer.

2. A method for backing up data in a case of a power failure of a storage system, the method comprising:
   when a power failure is detected, acquiring current refresh progress of a buffer in a storage system, an address of data that is in the buffer which needs to be backed up to a non-volatile memory in the storage system, and a first time required for backing up the data;
   calculating, according to the current refresh progress of the buffer and the address of the data in the buffer, a second time for which the data can at least keep being not lost since a last refresh; and
   stopping refreshing the buffer, and backing up the data to the non-volatile memory, when the second time is greater than the first time;
   wherein calculating, according to the current refresh progress of the buffer and the address of the data in the buffer, a second time for which the data can at least keep being not lost since a last refresh comprises:
      when a minimum row number p1 of the data in the buffer is greater than or equal to a row number p of the buffer corresponding to the current refresh progress, calculating the second time $t1=T1-[T2-(p1-p)*\Delta]$ for which the data can at least keep being not lost since the last refresh, wherein T1 is maximum time for which any row of data can keep after a refresh, T2 is a period for which a refresh is performed on the buffer, an interval at which two adjacent rows are refreshed $\Delta=T2/M$, and M is the total number of rows in the buffer.

3. The method according to claim 2, wherein calculating, according to the current refresh progress of the buffer and the address of the data in the buffer, the second time for which the data can at least keep being not lost since a last refresh comprises:
   when a maximum row number p2 of the data in the buffer is smaller than or equal to the row number p of the buffer corresponding to the current refresh progress, calculating the second time $t1=T1-(p-p1)*\Delta$ for which the data can at least keep being not lost since the last refresh.

4. The method according to claim 2, wherein calculating, according to the current refresh progress of the buffer and the address of the data in the buffer, the second time for which the data can at least keep being not lost since a last refresh comprises:
   when the row number p of the buffer corresponding to the current refresh progress is greater than the minimum row number p1 of the data in the buffer, and the row number p of the buffer corresponding to the current refresh progress is smaller than the maximum row number p2 of the data in the buffer, calculating the second time t1 for which the data can at least keep being not lost since the last refresh, wherein the second time t1 comprises t2 and t3; t2 is time for which data ranging from the row number p to the row number p2 can at least keep since the last refresh, $t2=T1-T2$; t3 is time for which data ranging from the row number p1 to the row number p can at least keep since the last refresh, $t3=T1-(p-p1)*\Delta-t4$; and t4 is time required for backing up the data ranging from the row number p to the row number p2 to the non-volatile memory.

5. The method according to claim 4, wherein stopping refreshing the buffer when the second time is greater than the first time comprises:

stopping refreshing the buffer when t2 is greater than t4 and t3 is greater than time t5 required for backing up the data ranging from the row number p1 to the row number p to the non-volatile memory.

6. A storage system controller, comprising:

an acquiring unit, configured to: when a power failure is detected, acquire current refresh progress of a buffer in a storage system, an address of data that is in the buffer which needs to be backed up to a non-volatile memory in the storage system, and a first time required for backing up the data;

a calculating unit, configured to calculate, according to the current refresh progress of the buffer and the address of the data in the buffer, a second time for which the data can at least keep being not lost since a last refresh;

a refreshing unit, configured to stop refreshing the buffer when the second time is greater than the first time; and a backup unit, configured to back up the data to the non-volatile memory;

wherein the acquiring unit is configured to acquire, from a counter, the current refresh progress of the buffer in the storage system, wherein the current refresh progress is a current count value of the counter and the count value of the counter increases according to a set value each time a refresh command is sent to the buffer.

7. A storage system controller, comprising:

an acquiring unit, configured to: when a power failure is detected, acquire current refresh progress of a buffer in a storage system, an address of data that is in the buffer which needs to be backed up to a non-volatile memory in the storage system, and a first time required for backing up the data;

a calculating unit, configured to calculate, according to the current refresh progress of the buffer and the address of the data in the buffer, a second time for which the data can at least keep being not lost since a last refresh;

a refreshing unit, configured to stop refreshing the buffer when the second time is greater than the first time; and a backup unit, configured to back up the data to the non-volatile memory;

wherein the calculating unit is configured to:

when a minimum row number p1 of the data in the buffer is greater than or equal to a row number p of the buffer corresponding to the current refresh progress, calculate the second time $t1=T1-[T2-(p1-p)*\Delta]$ for which the data can at least keep being not lost since the last refresh, wherein T1 is maximum time for which any row of data can keep after a refresh, T2 is a period for which a refresh is performed on the buffer, an interval at which two adjacent rows are refreshed $\Delta=T2/M$, and M is the total number of rows in the buffer.

8. The storage system controller according to claim 7, wherein the calculating unit is further configured to:

when a maximum row number p2 of the data in the buffer is smaller than or equal to the row number p of the buffer corresponding to the current refresh progress, calculate the second time $t1=T1-(p-p1)*\Delta$ for which the data can at least keep being not lost since the last refresh.

9. The storage system controller according to claim 7, wherein the calculating unit is further configured to:

when the row number p of the buffer corresponding to the current refresh progress is greater than the minimum row number p1 of the data in the buffer, and the row number p of the buffer corresponding to the current refresh progress is smaller than the maximum row number p2 of the data in the buffer, calculate the second time t1 for which the data can at least keep being not lost since the last refresh, wherein the second time t1 comprises t2 and t3; t2 is time for which data ranging from the row number p to the row number p2 can at least keep since the last refresh, $t2=T1-T2$; t3 is time for which data ranging from the row number p1 to the row number p can at least keep since the last refresh, $t3=T1-(p-p1)*\Delta-t4$; and t4 is time required for backing up the data ranging from the row number p to the row number p2 to the non-volatile memory.

10. The storage system controller according to claim 9, wherein the refreshing unit is configured to:

stop refreshing the buffer when t2 is greater than t4 and t3 is greater than time t5 required for backing up the data ranging from the row number p1 to the row number p to the non-volatile memory.

* * * * *